United States Patent
Lyons

(10) Patent No.: US 8,833,993 B1
(45) Date of Patent: Sep. 16, 2014

(54) WARNING LIGHT FRAME WITH INTEGRAL SCREW ANCHORS

(75) Inventor: Jon H. Lyons, Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 425 days.

(21) Appl. No.: 13/355,601

(22) Filed: Jan. 23, 2012

(51) Int. Cl.
- *F21V 9/00* (2006.01)
- *F21V 21/00* (2006.01)
- *B60Q 1/26* (2006.01)
- *B60Q 1/00* (2006.01)

(52) U.S. Cl.
USPC ........... 362/549; 362/542; 362/368; 362/382; 340/472; 411/511

(58) Field of Classification Search
USPC .......... 362/540–549, 368, 382–456; 411/511; 340/472
See application file for complete search history.

(56) References Cited

U.S. PATENT DOCUMENTS

| | | | |
|---|---|---|---|
| 2,788,047 A | 4/1957 | Rapata | |
| 2,956,468 A | 10/1960 | Macy | |
| 2,975,814 A | 3/1961 | Tinnerman | |
| 4,070,945 A | 1/1978 | Kurosaki | |
| 4,079,442 A * | 3/1978 | Tuerck | 362/549 |
| 4,082,030 A | 4/1978 | Erickson | |
| 4,214,505 A | 7/1980 | Aimar | |
| 4,312,165 A | 1/1982 | Mizusawa | |
| 4,472,918 A | 9/1984 | Mach | |
| 4,729,704 A | 3/1988 | Yokoyama | |
| 5,040,103 A * | 8/1991 | Lyons | 362/268 |
| 5,401,132 A | 3/1995 | Akema | |
| 5,647,713 A | 7/1997 | Ge et al. | |
| 5,797,714 A | 8/1998 | Oddenino | |
| 6,966,682 B2 * | 11/2005 | Frank et al. | 362/544 |
| 2004/0016088 A1 | 1/2004 | Angellotti | |
| 2007/0018482 A1 | 1/2007 | Tuohimaa et al. | |
| 2008/0232129 A1 * | 9/2008 | Lyons | 362/547 |
| 2013/0077336 A1 * | 3/2013 | Helterbrand et al. | 362/541 |

* cited by examiner

Primary Examiner — Mariceli Santiago

(74) Attorney, Agent, or Firm — Alix, Yale & Ristas, LLP

(57) ABSTRACT

A warning light assembly includes a frame with integral fastener anchors. The frame aligns and supports the anchors with openings in a vehicle body or other support surface. Fasteners pass through a warning light housing to spread retention legs behind the support surface. The anchors are connected by the frame and cannot rotate relative to the vehicle body or warning light. The frame defines a central opening for warning lights requiring additional depth.

8 Claims, 5 Drawing Sheets

WARNING LIGHT FRAME WITH INTEGRAL SCREW ANCHORS

FIELD OF THE INVENTION

The present disclosure relates to apparatus and methods for mounting warning lights to the exterior of motor vehicles used for emergency response such as police, rescue, fire, and ambulance vehicles.

BACKGROUND OF THE INVENTION

Emergency vehicles require warning lights arranged about the exterior to emit warning light signals in patterns specified by various federal and state regulations as well as standards set by industry organizations. Standards relevant to this disclosure include: the Federal KKK Standard for ambulance lighting, the Society of Automotive Engineers (SAE) Surface Vehicle Recommended Practice standards including SAEJ595, J1849, J759, J845, National Fire Protection Association (NFPA) standard 1901, and California Code of Regulations Title 13. The standards set forth in these documents include specifications for exterior warning lighting for emergency vehicles. To meet these requirements, it is frequently necessary to mount warning lights to the exterior surface of motor vehicles. Motor vehicle bodies are typically constructed of sheet material such as sheet steel, aluminum and/or plastic. Typically, a vehicle to which warning lights are to be mounted has already been constructed, so access to the rear side of the sheet material forming the exterior of the motor vehicle is obstructed. The situation where access to the rear of a mounting surface is obstructed is typically referred to a "blind" installation.

One approach to a blind installation has been to use individual screw grommets placed in holes formed in the vehicle's sheet material. Screw grommets are typically configured for use in either a round hole or a shaped hole. Shaped holes are typically in the form of a square where the outside surfaces of the head of the screw grommet match the shape of the hole and prevent rotation of the screw grommet in the hole. Round screw grommets employ retaining mechanisms configured to be inserted through a round hole. Screw grommets used in round holes can be problematic in that the engagement between the outside surface of the screw grommet and the round hole is relatively light, meaning that relatively little rotational force applied to the screw grommet can cause rotation of the screw grommet relative to the work piece and prevent proper insertion of a fastener through the screw grommet. A common problem with individual screw grommets is that the screw grommet will rotate behind the warning light, preventing advancement of fasteners through the screw grommet to secure the light to the vehicle. Once a screw grommet begins rotating behind a partially installed warning light, removal of the fastener and warning light is problematic.

Alternatively, sheet metal screws have been employed directly though the sheet material of the vehicle exterior. Sheet metal fasteners have a tendency to strip, preventing secure attachment of the warning light to the vehicle. Further, sheet metal fasteners have the potential to exert excessive force on the warning light, resulting in bent or cracked warning light housings.

There is a need for a simplified apparatus and method for securing warning lights to the exterior of motor vehicles.

SUMMARY OF THE DISCLOSURE

A warning light assembly is disclosed which includes a frame equipped with a plurality of screw anchors integrally molded with the frame. The frame includes fastener receptacles with retaining legs projecting from the rear surface of the frame facilitate mounting of a warning light assembly to the exterior of a motor vehicle. Each fastener receptacle defines a bore extending from the front surface to the rear surface of the frame. In the disclosed embodiment, a pair of divergent retention legs extends from the rear surface of the frame flanking the bore of each fastener receptacle. The retention legs include a fastener bearing surface facing the bore and an outside surface configured for insertion through an aperture in the vehicle body. The outside surface of each retention leg includes a tapered portion adjacent the distal tip so that each pair of retention legs narrows at its distal end to facilitate insertion through a hole in a vehicle body. An intermediate portion of the outside surface of each retention leg includes a plurality of ribs or ridges, which serve to catch on the inside diameter of the hole in the vehicle body. The retention legs are constructed so that the fastener bearing surfaces impinge on the bore of each fastener receptacle. A fastener inserted into the bore of a fastener receptacle contacts the fastener bearing surfaces of the pair of retention legs. The frame and retention legs are preferably molded from a plastic material such as nylon which permits the fastener to cut threads in the fastener bearing surface, thereby engaging the fasteners securely with each fastener receptacle. The flexible material of the frame and retention legs also permits the retention legs to flex inwardly during insertion through the body openings and outwardly in response to pressure from the fastener. Continued threaded rotation of the fastener into the fastener receptacle axially advances the fastener through the bore and exerts an outward deflecting force on the retention legs behind the vehicle sheet material, securely affixing the warning light and frame to the vehicle exterior surface.

The retention legs may preferably be molded as one piece with the frame. In an alternative embodiment, the frame may be provided with appropriately shaped holes into which screw anchors may be fitted.

The disclosed frame permits simplified assembly and installation of warning lights to the exterior of motor vehicles. Holes in the vehicle sheet material are placed according to a template and made using standard hole making equipment, such as an electric drill. The frame is aligned with the holes and the retention legs are inserted through the holes, where the outside surface of the retention legs frictionally engages the inside diameter of the holes, retaining the frame to the vehicle. Electrical connections are made to the warning light, fasteners are placed through the openings in the warning light and threaded into the fastener receptacles of the frame. The fasteners are then driven into the fastener receptacles to secure the warning light to the vehicle. The fastener receptacles cannot rotate relative to the vehicle or warning light assembly, therefore fastener installation and removal is simple and reliable.

DETAILED DESCRIPTION OF THE PREFERRED EMBODIMENT

Figure 1:
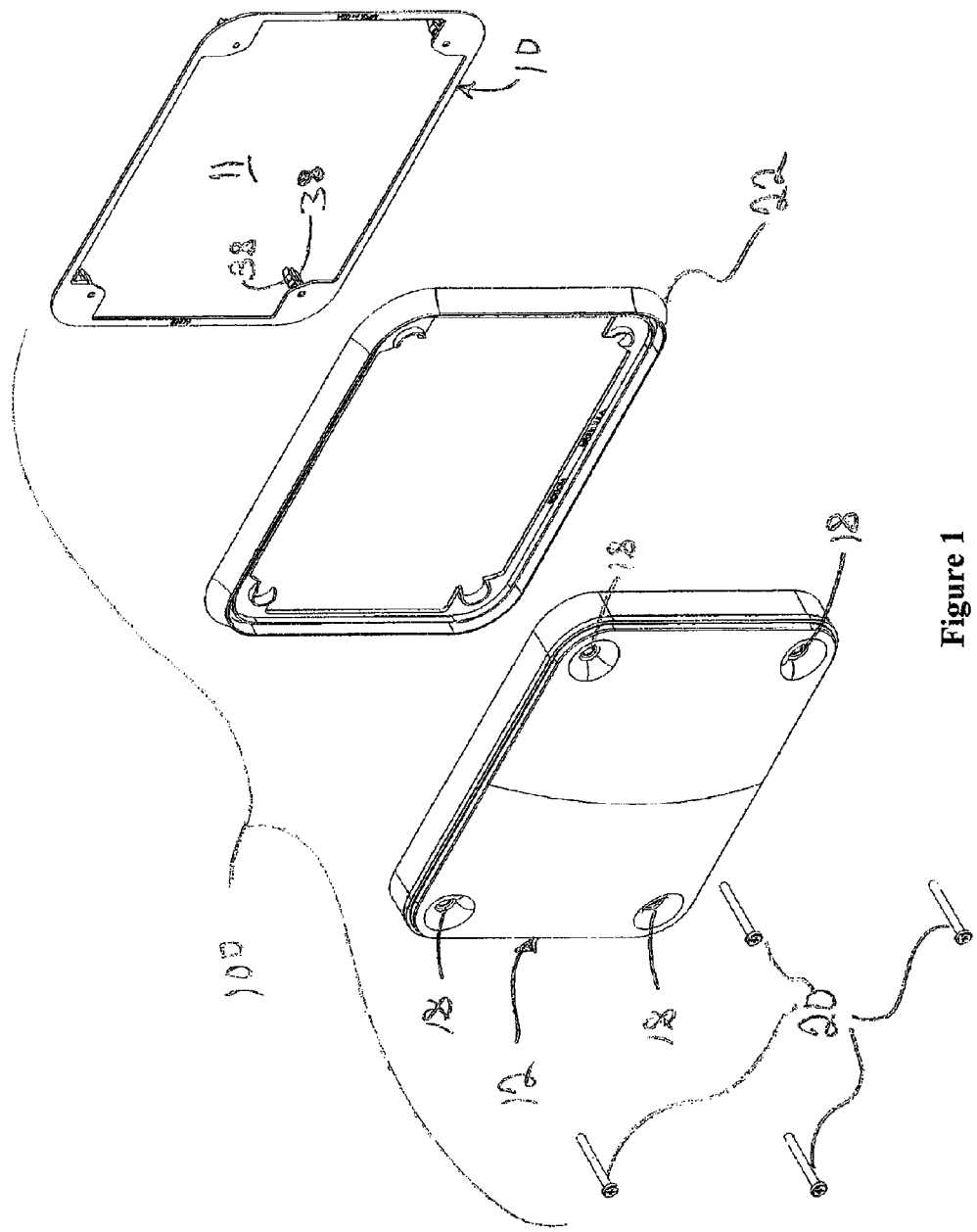
FIG. 1 is an exploded, perspective view of a warning light assembly incorporating a frame with integral anchors according to the present disclosure.
Figure 2:
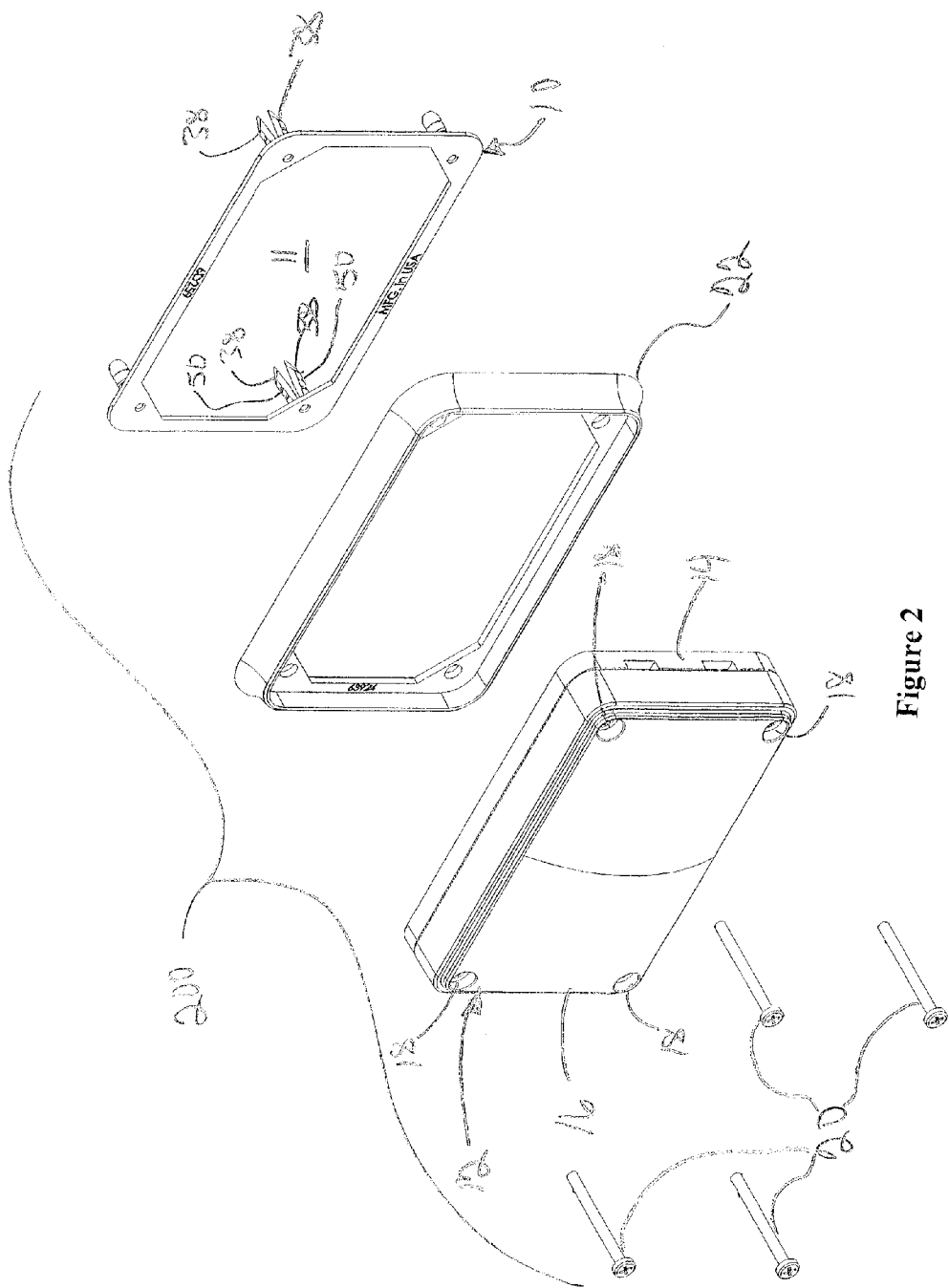
FIG. 2 is an exploded, perspective view of a second warning light assembly incorporating a frame with integral anchors according to the present disclosure.

FIGS. 1 and 2 illustrate warning light assemblies 100, 200 designed to be mounted on the exterior surfaces of motor vehicles (not shown) such as fire trucks, rescue vehicles and ambulances. The disclosed warning light assemblies 100, 200 are typically mounted to vertical surfaces on the front, sides, and rear of emergency vehicles. Emergency vehicles are commonly trucks or vans with vehicle bodies constructed of sheet materials such as steel, plastic, or fiber glass. Warning lights are installed after the vehicle is substantially complete and it is common for the installer to have access only to the outside surface of the sheet material forming the vehicle body. Such an installation may be referred to as a "blind" installation. This means that any mounting system must be capable of installation from the outside of the vehicle and cannot require access to the rear surface of the vehicle panel.

The illustrated warning light assemblies 100, 200 include a warning light having a housing 12 which defines an interior space for light emitters and reflectors and/or optics (not shown) necessary for generating a predefined warning light emission pattern when the light is energized. The housing 12 may be constructed with an interfitting base 14 and dome 16, as shown in FIG. 2, which together define a substantially waterproof enclosure for the internal components of the warning light. The illustrated warning light housings 12 also define a plurality of passages 18 for fasteners 20 to engage retention mechanisms fixed to the vehicle body to secure the warning light to the vehicle. The illustrated warning lights may also include a grommet 22 molded of flexible rubber or similar material which is placed between the vehicle and the warning light. In the disclosed embodiments, the grommet 22 provides a finished appearance to the mounted warning light and also serves to prevent water from penetrating behind the warning light. The warning light may be mounted without a grommet or may alternatively include a plastic bezel (not shown) surrounding the warning light housing 12.

Figure 3:
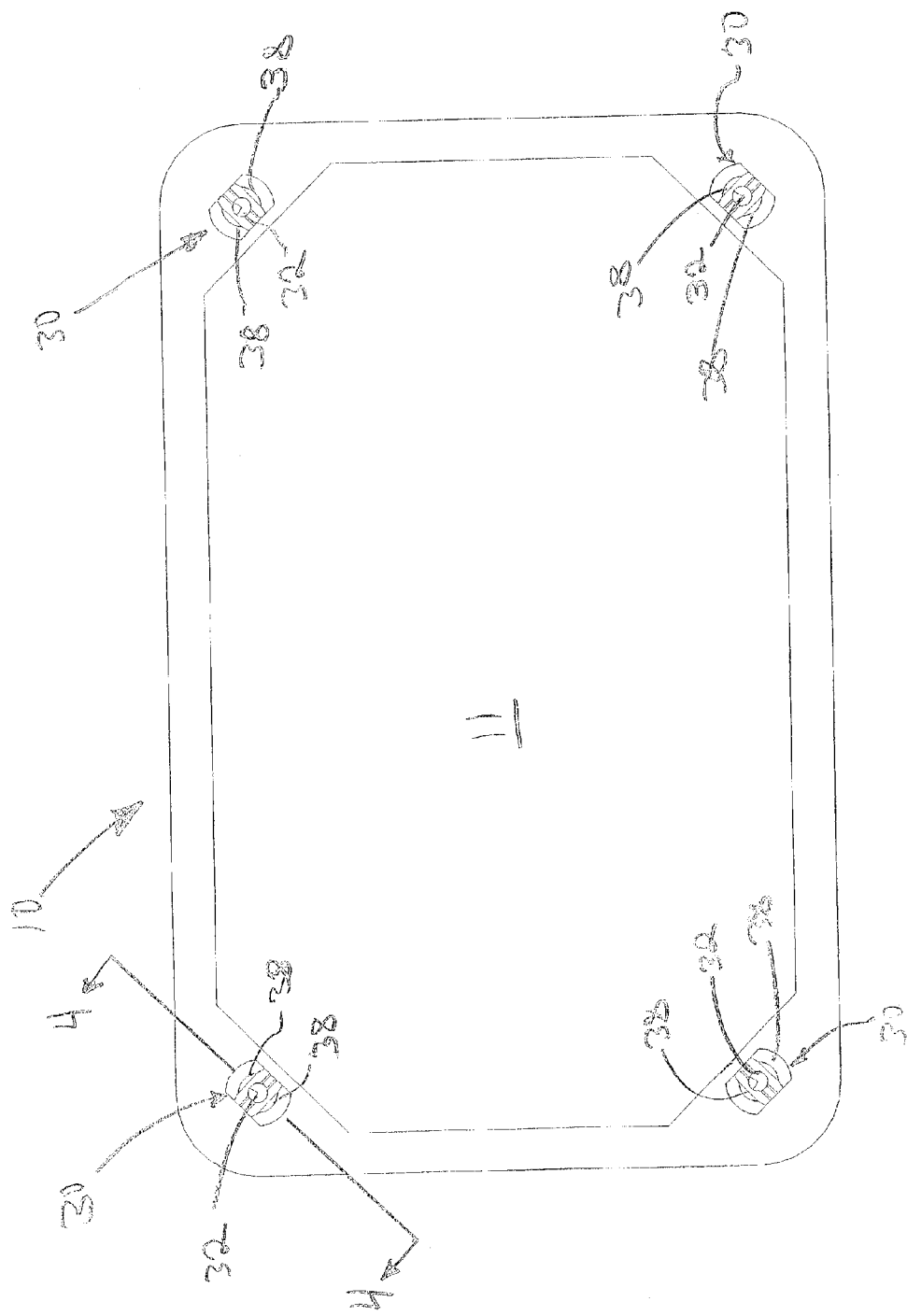
FIG. 3 is a rear plan view of a frame with integral anchor according to the present disclosure.
Figure 4:
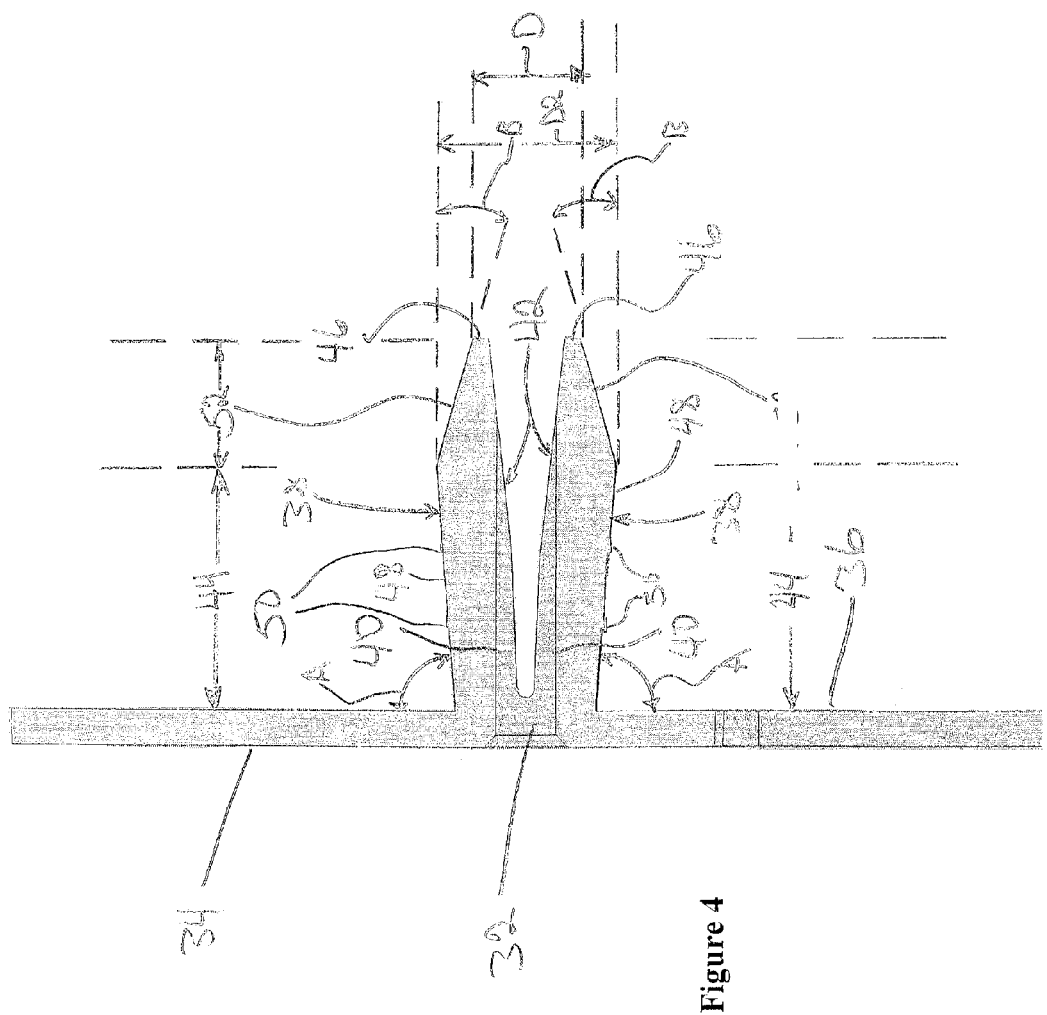
FIG. 4 is a sectional view through the frame with integral anchor of FIG. 3, taken along line 4-4 thereof.

The disclosed warning light assemblies include a frame 10 with a plurality of integral anchors 30. The frame 10 defines anchors 30 configured to receive fasteners 20 extending through the warning light housing 12 and grommet 22. Each anchor 30 defines a bore 32 extending from the front face 34 of the frame to the rear face 36 of the frame 10. In the disclosed embodiments, a pair of retention legs 38 extends from the rear face 36 of the frame 10 flanking the bore 32 of each anchor 30. As shown in FIGS. 3 and 4, each bore 32 is cylindrical and is partially defined by an inner fastener bearing surface 40 of the opposed retention legs. The retention legs 38 are separated by a generally V-shaped notch 42 configured to permit the retention legs 38 to move relative to each other. The retention legs 38 flex inwardly (toward each other) during insertion into an opening in the vehicle body and outwardly (away from each other) as a fastener 20 is axially advanced between the retention legs 38.

Figure 5:
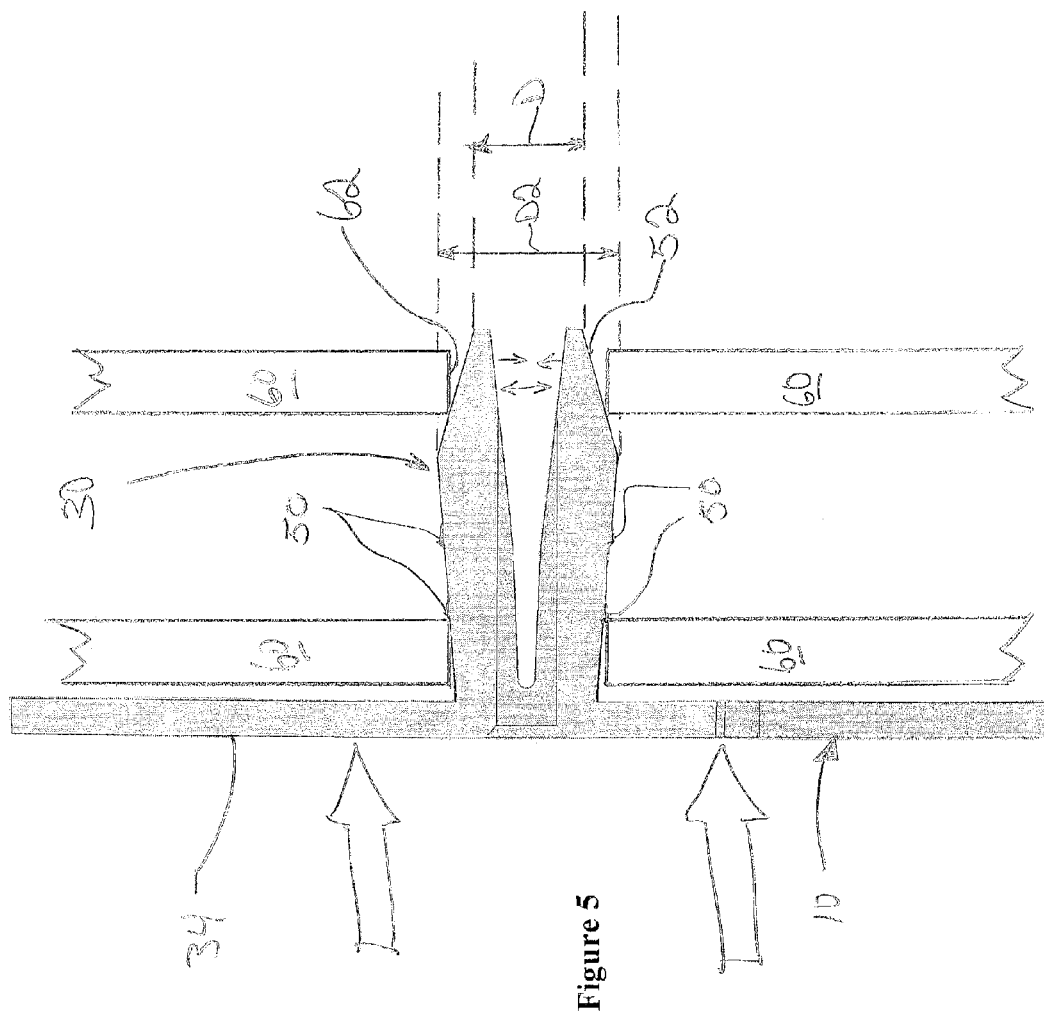
FIG. 5 is the sectional view of FIG. 4, with the frame and anchor shown in proximity to a vehicle panel.

Each of the retention legs 38 has distinct portions with a configuration related to the function of that portion of the retention leg. An intermediate portion 44 of each retention leg 38 extends from the rear face 36 of the frame 10 toward the distal tip 46 of the retention leg 38, extending approximately ⅔ of the length of the retention leg 38 measured between the rear face 36 of the frame 10 and the distal tip 46 of each retention leg 38. This intermediate portion 44 of each retention leg 38 defines approximately ½ of the circumference of the fastener bearing surface 40 facing the bore 32 and includes an outside surface 48 configured to contact the inside diameter of a mounting hole in a vehicle. The outside surface 48 of each retention leg is angled with respect to a plane defined by the rear face 36 of the frame 10. The outside surface 48 of each leg can be described as a canted or angled semi cylindrical surface. As shown in FIGS. 4 and 5, the intermediate portion of the outside surface 48 of each retention leg 38 includes a plurality of ridges or ribs 50 configured to catch the inside circumference of a hole 62 in a vehicle panel 60 to temporarily retain the frame 10 against the outside surface of the vehicle. The ridges or ribs 50 in the disclosed embodiments take the form of a barb having a mildly sloped leading side and a sharply sloped trailing side to facilitate insertion of the retention legs 38 through a hole 62 in a vehicle panel 62 but to resist removal of the retention legs 38 from the hole 62. As can be seen in FIG. 4, the thickness of each retention leg 38 increases from its juncture with the frame 10 to a maximum at the distal end of the intermediate portion 44 of each retention leg 38. This configuration results in a divergent outside surface for each pair of retention legs 38, forming an acute angle A with the rear surface 36 of the frame 10. This divergent outside surface 48 in combination with the ridges, ribs or barbs 50 on the outside surface frictionally engage the inside circumference of a hole in a vehicle panel to retain the frame against the vehicle body.

The distal end of each retention leg 38 includes an aperture engagement surface 52 between the intermediate portion 44 and a distal tip 46 of each retention leg 38. In the disclosed embodiments, the aperture engagement surface 52 takes the form of an angled arcuate surface positioned to taper the distal portion of each retention leg 38 toward the other leg. The aperture engagement surface 52 forms an acute angle B with a direction perpendicular to the plane of the rear face 36 of the frame. This configuration reduces the diameter at the distal tip 46 of each pair of retention legs. Each pair of retention legs 38 is configured to be inserted through a hole 62 in a vehicle panel 62 or other support structure. The hole 62 will have an inside diameter greater than a distance D between the distal ends 46 of each pair of retention legs 38 and smaller than the maximum diameter D2 of each pair of retention legs 38.

During installation of a warning light 100, 200 employing the apparatus and methods disclosed in this application, a template is used to prepare the correct number and placement of holes in the vehicle panel or support surface. The disclosed frame 10 with integral anchors 30 is then aligned with the holes and the distal end of each pair of retention legs 38 is inserted into the holes as shown in FIG. 5. Light force applied to the front face 34 of the frame 10 causes the aperture engagement surfaces 52 to bear on the inside diameter of each hole 62 and forces the distal ends 46 of each pair of retention legs 38 towards each other. When the retention legs 38 have moved toward each other sufficiently that the outside diameter of each pair of retention legs is less than the inside diameter of each hole 62, the pairs of retention legs 38 pass through the hole 62 and expand on the other side of the vehicle panel or support structure. The raised ridges or ribs 50 on the intermediate portion 44 of the outside surface 48 of each retention leg 38 engage the inside diameter of each hole 62 to retain the frame 10 in position. A warning light assembly 100, 200 is connected to the electrical system of the vehicle and placed in position against the frame 10. Fasteners 20 are passed through the warning light housing 12 and into the anchors 30 of the frame 10. Appropriate rotation of each fastener 20 engages the fastener threaded surface with the fastener engagement surface 40 defined on the inside of each anchor 30. The relatively soft material of the anchor 30, is cut or deformed by the threaded outside surface of the fastener 20 so that each fastener is engaged with the inside of each anchor. Continued rotation of each fastener advances the fastener axially through the warning light housing 12 and anchors 30. Axial advancement of each fastener 20 exerts an expansive force on the fastener bearing surface 40, pushing the retention legs 38 away from each other behind the vehicle panel 60 or support surface. Each pair of expanded retention legs 38 serves to securely retain the frame 10 and warning light 100, 200 against the emergency vehicle outside panel or support surface.

The frame 10 extends between and connects the plurality of integral anchors 30. Thus, the anchors 30 are prevented from rotation relative to the remainder of the frame 10. The frame 10 also defines a central opening 11 to accommodate warning lights that have a depth requiring an opening in the vehicle body. This feature makes the frame 10 compatible with older, halogen and strobe warning lights.

Preferred embodiments of a warning light assembly and frame with anchors are described herein. Variations of the preferred embodiments may become apparent upon reading the foregoing description. The attached claims are intended to encompass all such variations.

What is claimed is:

1. A warning light assembly comprising:
   a warning light having a housing including a plurality of fastener passages extending from a housing light emission surface to a housing mounting surface;
   a frame including a plurality of anchors, each anchor arranged to be in alignment with one of said fastener passages to receive a fastener extending through said housing, each said anchor defining a bore extending from a front surface to a rear surface of said frame and flanked by a plurality of retention legs extending from said frame rear surface to a distal tip, said retention legs arranged about said bore, each said retention leg including a tapered outside surface centered on said bore and extending to said distal tip, each said retention leg including a fastener bearing surface facing said bore; and
   a plurality of fasteners having a length sufficient to extend through said fastener passage and said bore to contact said fastener bearing surfaces, continued axial penetration of each said fastener through said passage and bore after contact with said bearing surfaces forcing said retention legs apart.

2. The warning light assembly of claim 1, wherein said frame extends between and connects said anchors.

3. The warning light assembly of claim 1, wherein the outside surface of each leg includes a plurality of axially spaced ribs.

4. The warning light assembly of claim 1, wherein said retention legs are integral to said frame.

5. The warning light assembly of claim 1, wherein said warning light housing and said frame have complementary geometric shapes and substantially the same peripheral dimensions.

6. The warning light assembly of claim 1, wherein said plurality of retention legs comprises two retention legs arranged on opposite sides of each said bore.

7. The warning light assembly of claim 1, wherein said frame extends between and connects said anchors and defines a central aperture through which a portion of said warning light extends.

8. A method of installing a warning light to the exterior surface of a motor vehicle, said method comprising:
   providing a warning light having a housing including a plurality of fastener passages extending from a housing light emission surface to a housing mounting surface;
   providing a frame including a plurality of anchors, each anchor arranged to be in alignment with one of said fastener passages to receive a fastener extending through said housing, each said anchor defining a bore extending from a front surface to a rear surface of said frame and flanked by a plurality of retention legs extending from said frame rear surface to a distal tip, each said retention leg including a tapered outside surface centered on said bore and extending to said distal tip, each said retention leg extending from said rear surface and including a fastener bearing surface facing said bore;
   providing a plurality of threaded fasteners having a length sufficient to extend through said fastener passage and said bore to contact said fastener bearing surfaces;
   forming a plurality of apertures in said vehicle exterior surface, said plurality of apertures arranged to receive the retention legs flanking each of said bores;
   aligning said housing and frame with said plurality of apertures;
   inserting the retention legs flanking each bore through respective of said apertures wherein said retention legs frictionally engage said apertures to retain said frame to said vehicle;
   inserting one of said plurality of threaded fasteners through each said fastener passage and into the bore of a corresponding fastener receptacle; and
   rotating said fastener to engage said fastener with the fastener bearing surface of the retention legs flanking each said bore, continued rotation of each said threaded fastener axially advancing said fastener through said passage and bore to force said retention legs apart, thereby securing said warning light housing and frame to said vehicle exterior surface.

\* \* \* \* \*